(12) United States Patent
Nishiyama

(10) Patent No.: US 7,217,192 B2
(45) Date of Patent: May 15, 2007

(54) GAME MACHINE AND GAME SYSTEM

(75) Inventor: Takashi Nishiyama, Osaka (JP)

(73) Assignee: SNK Playmore Corporation, Osaka (JP)

(*) Notice: Subject to any disclaimer, the term of this patent is extended or adjusted under 35 U.S.C. 154(b) by 462 days.

(21) Appl. No.: 10/195,039

(22) Filed: Jul. 13, 2002

(65) Prior Publication Data

US 2003/0060287 A1 Mar. 27, 2003

Related U.S. Application Data

(63) Continuation of application No. 09/182,391, filed on Oct. 28, 1998, now abandoned.

(30) Foreign Application Priority Data

| Oct. 28, 1997 | (JP) | ................................. 9-312794 |
| Dec. 29, 1997 | (JP) | ................................. 9-367894 |

(51) Int. Cl.
*A63F 13/00* (2006.01)
*A63F 9/24* (2006.01)
*G06F 17/00* (2006.01)
*G06F 19/00* (2006.01)

(52) U.S. Cl. .............................. 463/43; 463/63; 463/1; 463/6; 463/30

(58) Field of Classification Search .................. 463/45, 463/63, 1–2, 6–8, 30–47, 49, 58–68; 273/317.1, 273/148 R, 148 B, 441, 459–461; 446/268–275, 446/276, 277–296, 175, 409, 410, 436, 454–456, 446/484, 491

See application file for complete search history.

(56) References Cited

U.S. PATENT DOCUMENTS

| 3,926,434 | A | | 12/1975 | Cannon, Jr. .................. 104/301 |
| 4,334,221 | A | | 6/1982 | Rosenhagen et al. .......... 463/6 |
| 4,406,085 | A | * | 9/1983 | Rhodes ........................ 446/456 |
| 4,591,158 | A | * | 5/1986 | Samson et al. ........ 273/108.22 |
| 4,654,659 | A | * | 3/1987 | Kubo ..................... 340/825.76 |
| 4,712,184 | A | | 12/1987 | Haugerud .................... 364/513 |
| 4,729,563 | A | * | 3/1988 | Yokoi .......................... 463/31 |
| 4,815,733 | A | * | 3/1989 | Yokoi .......................... 463/31 |
| 4,840,602 | A | * | 6/1989 | Rose .......................... 446/175 |
| 4,930,019 | A | * | 5/1990 | Chu ............................ 386/96 |
| 4,938,483 | A | | 7/1990 | Yavetz ........................ 463/5 |
| 4,942,506 | A | | 7/1990 | Flory ......................... 362/253 |
| 4,964,837 | A | | 10/1990 | Collier ...................... 446/409 |
| 4,995,610 | A | * | 2/1991 | Paoletti ......................... 463/8 |
| 5,100,153 | A | * | 3/1992 | Welte ......................... 273/357 |

(Continued)

FOREIGN PATENT DOCUMENTS

JP    3-79035    12/1985

(Continued)

*Primary Examiner*—Robert Olszewski
*Assistant Examiner*—Binh-An D. Nguyen

(57) ABSTRACT

A game apparatus that has a game machine for advancing a game according to a program and a mobile unit moving based on information data from the game machine. Further, a game system for a game player to play a game using a controller and a toy, comprising a storage step for the for the game player to manipulate the controller for moving the toy for bringing up a toy motion and store the brought-up toy motion and a reproduction step for the game player to manipulate the controller for reproducing the stored toy motion.

4 Claims, 12 Drawing Sheets

U.S. PATENT DOCUMENTS

| | | | | |
|---|---|---|---|---|
| 5,127,658 | A | 7/1992 | Openiano | 463/50 |
| 5,169,156 | A | 12/1992 | Smollar | 273/371 |
| 5,195,920 | A | 3/1993 | Collier | 446/409 |
| 5,375,847 | A * | 12/1994 | Fromm et al. | 463/5 |
| 5,435,553 | A * | 7/1995 | Arima et al. | 463/6 |
| 5,452,901 | A * | 9/1995 | Nakada et al. | 446/454 |
| 5,471,668 | A * | 11/1995 | Soenen et al. | 455/352 |
| 5,596,319 | A * | 1/1997 | Spry | 340/903 |
| 5,601,490 | A | 2/1997 | Nakagawa et al. | 463/63 |
| 5,636,994 | A * | 6/1997 | Tong | 434/308 |
| 5,655,945 | A * | 8/1997 | Jani | 446/175 |
| 5,697,829 | A * | 12/1997 | Chainani et al. | 446/436 |
| 5,724,074 | A | 3/1998 | Chainani et al. | 345/474 |
| 5,727,982 | A * | 3/1998 | Hurt | 446/352 |
| 5,752,880 | A | 5/1998 | Gabai et al. | 463/1 |
| 5,759,100 | A | 6/1998 | Nakanishi | 463/37 |
| 5,766,077 | A | 6/1998 | Hongo | 463/30 |
| 5,865,661 | A | 2/1999 | Cyrus et al. | 446/136 |
| 5,873,765 | A * | 2/1999 | Rifkin et al. | 446/301 |
| 5,888,135 | A * | 3/1999 | Barton et al. | 463/39 |
| 5,892,221 | A * | 4/1999 | Lev | 250/222.1 |
| 5,906,542 | A * | 5/1999 | Neumann | 463/52 |
| 5,912,454 | A | 6/1999 | Castillo et al. | 250/205 |
| 5,919,092 | A | 7/1999 | Yokoi et al. | 463/37 |
| 5,977,951 | A | 11/1999 | Danieli et al. | 345/156 |
| 6,022,273 | A * | 2/2000 | Gabai et al. | 463/39 |
| 6,074,271 | A * | 6/2000 | Derrah | 446/457 |
| 6,075,195 | A * | 6/2000 | Gabai et al. | 84/645 |
| 6,289,263 | B1 * | 9/2001 | Mukherjee | 700/245 |

FOREIGN PATENT DOCUMENTS

| | | |
|---|---|---|
| JP | 63-277081 | 11/1988 |
| JP | 2-31783(A) | 2/1990 |
| JP | 05031255 | 2/1993 |
| JP | 07-047175 | 2/1995 |
| JP | 08024440 | 1/1996 |
| JP | 08243253 | 9/1996 |
| JP | 09047575 | 2/1997 |
| JP | 09084960 | 3/1997 |
| JP | 09099175 | 4/1997 |
| JP | 10151274 | 6/1998 |
| JP | 10327439 | 12/1998 |
| JP | 11000473 | 1/1999 |

* cited by examiner

FIG. 6

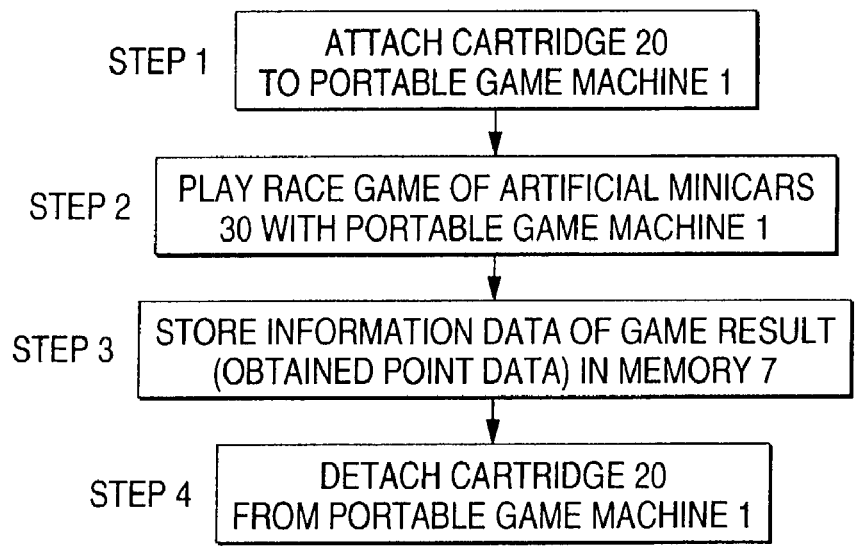

STEP FOR PLAYING FIRST GAME

STEP 1: ATTACH CARTRIDGE 20 TO PORTABLE GAME MACHINE 1

STEP 2: PLAY RACE GAME OF ARTIFICIAL MINICARS 30 WITH PORTABLE GAME MACHINE 1

STEP 3: STORE INFORMATION DATA OF GAME RESULT (OBTAINED POINT DATA) IN MEMORY 7

STEP 4: DETACH CARTRIDGE 20 FROM PORTABLE GAME MACHINE 1

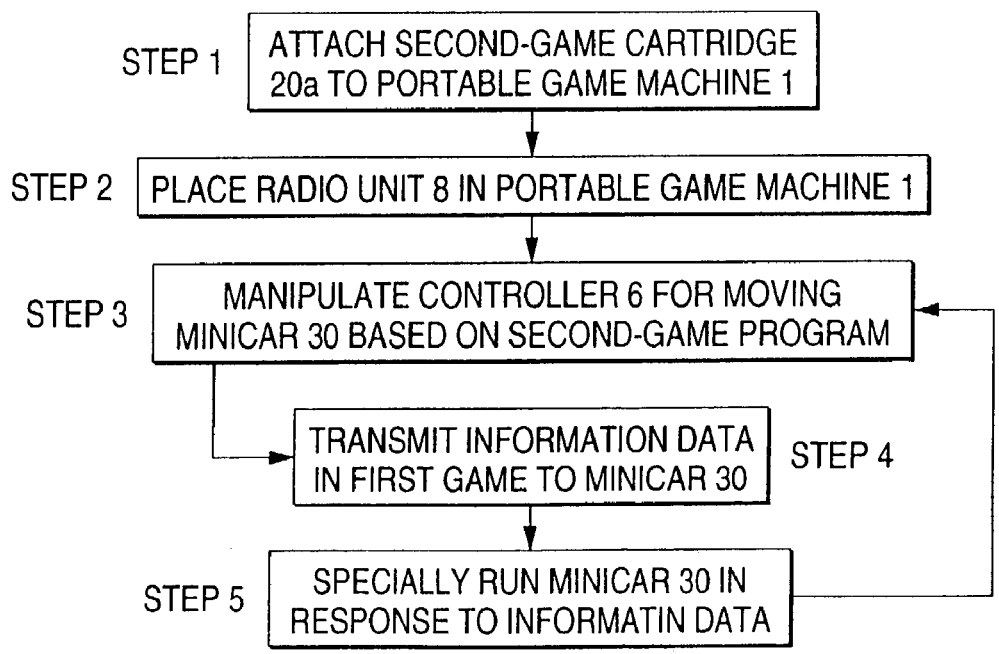

STEP FOR PLAYING SECOND GAME

STEP 1: ATTACH SECOND-GAME CARTRIDGE 20a TO PORTABLE GAME MACHINE 1

STEP 2: PLACE RADIO UNIT 8 IN PORTABLE GAME MACHINE 1

STEP 3: MANIPULATE CONTROLLER 6 FOR MOVING MINICAR 30 BASED ON SECOND-GAME PROGRAM

STEP 4: TRANSMIT INFORMATION DATA IN FIRST GAME TO MINICAR 30

STEP 5: SPECIALLY RUN MINICAR 30 IN RESPONSE TO INFORMATIN DATA

US 7,217,192 B2

GAME MACHINE AND GAME SYSTEM

This application is a continuation of application Ser. No. 09/182,391 filed Oct. 28, 1998 now abandoned.

BACKGROUND OF THE INVENTION

This invention relates to a game apparatus comprising a game machine and a mobile unit moving in association with the game machine, and to a game system using a controller and a toy.

A known video game in related art comprises a display section of a liquid crystal screen, etc., for displaying an artificial character, etc., and a controller for a game player to convey his or her intention, wherein a cartridge containing game software memory is used to advance a game program and the game player plays a game while moving the artificial character, etc., on the display section by operating the controller.

In recent years, artificial characters, etc., appearing in video games, to which a large number of people including game players feel an attachment, have been provided in the form of three-dimensional toys like stuffed toys, key holders, or models.

However, the characters in the form of three-dimensional toys do not act like artificial characters appearing in video games and the game players are hard to feel close to them.

Moreover, the characters in the form of three-dimensional toys are very loosely related to games played with video games and the game players feel them to be separate from the games.

Moreover, the game player plays a game passively in such a manner playing a game according to a predetermined program; the game itself is not much creative and the game player is not attached to the toy.

It is therefore an object of the invention to provide a game player with a highly interesting game apparatus that enables the game player to easily have empathy with characters, etc.

SUMMARY OF THE INVENTION

To the first end, according to the invention, there is provided a game apparatus comprising a game machine for advancing a game according to a program and a mobile unit moving based on information data from the game machine.

The game machine refers to a portable game machine that can be carried by the game player and comprises a display section for displaying the game contents, a home game machine or a personal computer game machine which enables the game player to play a game at home and can be connected to a display section for displaying the game contents, an arcade game machine placed in a store such as an amusement arcade for the game player to play a game by inputting a coin, etc., or the like.

The information data includes data obtained during gaming as well as data obtained as the result of playing a game using the game machine.

The information data also includes data for moving the mobile unit using the game machine and new data gotten by moving the mobile unit regardless of whether or not a game is played with the game machine.

The information data is transmitted from the game machine to the mobile unit by an information data communicating means such as wire, radio, or a storage medium. If a function of transmitting the information data from the mobile unit to the game machine is added, it is also made possible to transfer the information data between the game machine and the mobile unit.

The mobile unit moving based on information data refers to a mobile unit that receives transmitted information data and makes some motion accordingly. The mobile unit may move immediately upon reception of information data or may move with a delay.

The mobile unit refers to a three-dimensional form, such as a model of a character appearing in a game played with the game machine or a robot or a schoolgirl doll little related to games.

To the second end, according to the invention, there is provided a game system for a game player to play a game using a controller and a toy, comprising a storage step for the game player to manipulate the controller for moving the toy for bringing up a toy motion and store the brought-up toy motion and a reproduction step for the game player to manipulate the controller for reproducing the stored toy motion.

Information data can be transmitted and received between the controller and the toy through information data communication means such as wire or wireless.

The controller may be not only a special-purpose machine for moving the toy, but also a game machine with which other games can also be played.

The toy refers to a three-dimensional form, such as a model of a character appearing in a game, a robot, a schoolgirl doll, or any other type of three-dimensional form toy.

BRIEF DESCRIPTION OF THE DRAWINGS

In the accompanying drawings:

FIG. 6 is a flowchart to describe a flow for a game player to play a game with the game apparatus.

DETAILED DESCRIPTION OF THE PREFERRED EMBODIMENTS

Referring now to the accompanying drawings, there is shown an embodiment of the invention.

(First Embodiment)

Figure 1:
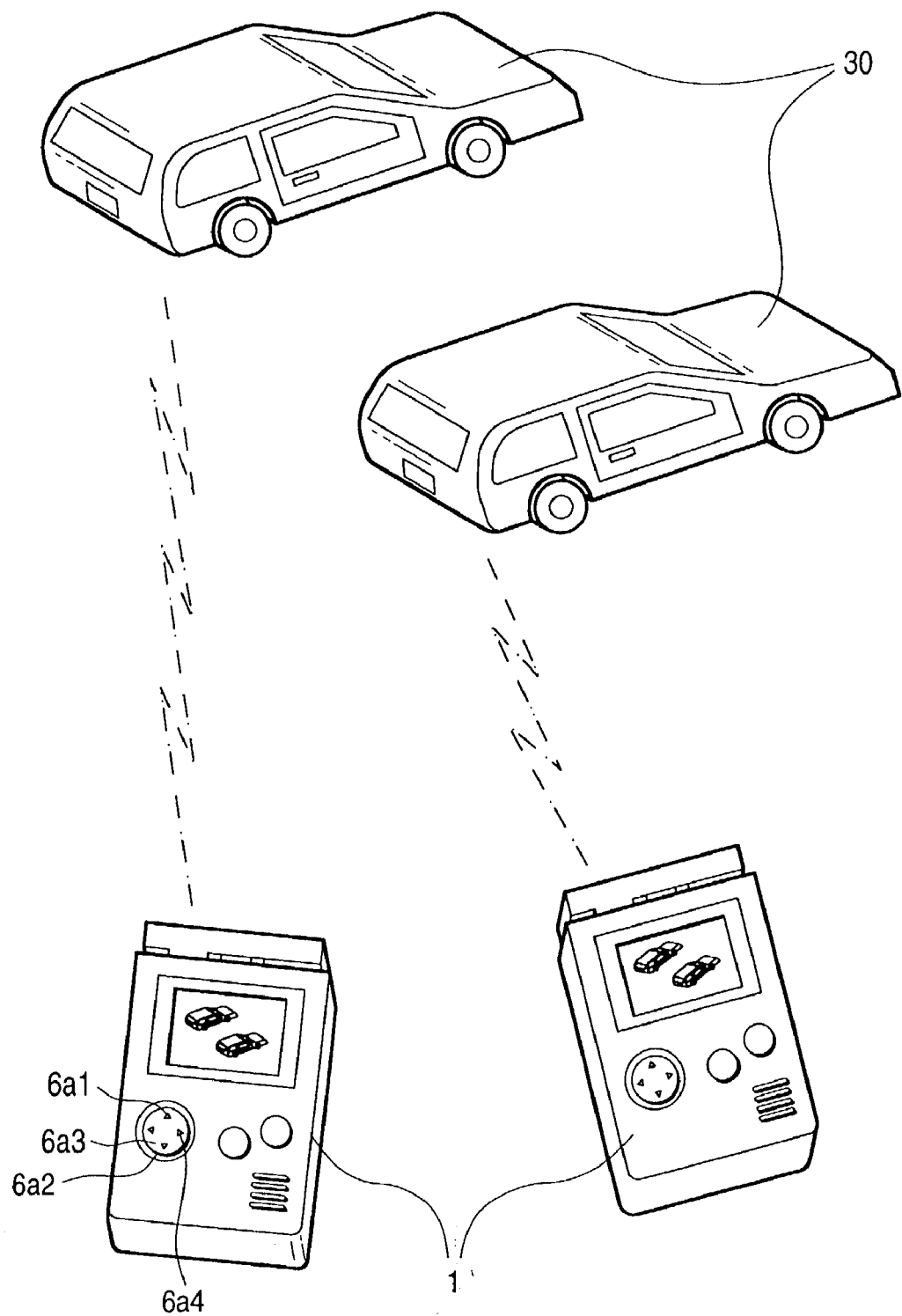
FIG. 1 is a perspective view of the main part to show one embodiment of a game apparatus in the invention.

FIG. 1 is a perspective view of the main part to show a first embodiment of a game apparatus in the invention.

Figure 2:
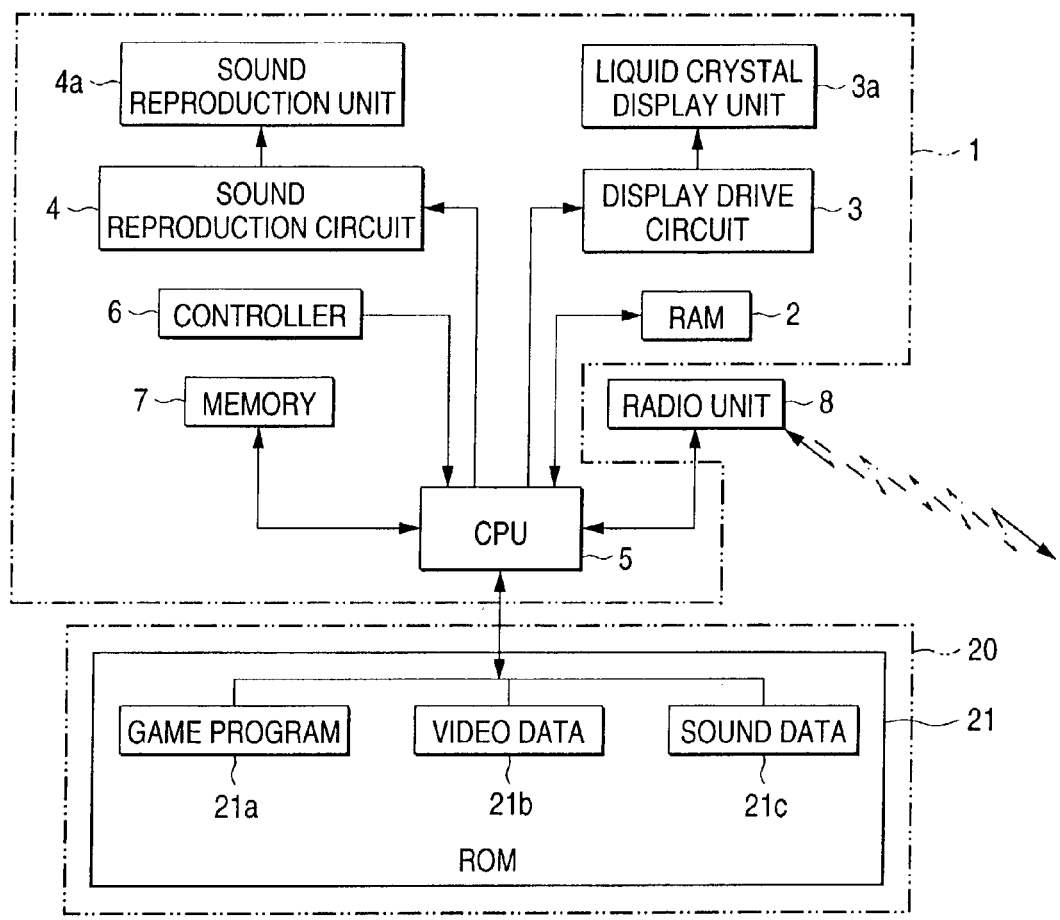
FIG. 2 is a functional block diagram to describe the function of a portable game machine in the embodiment of the invention.

The game apparatus shown in FIG. 1 comprises a portable game machine 1 as a game machine and a toy minicar 30 as a mobile unit. A game sequence is as follows: First, the game player plays a first game with the portable game machine 1 and stores information data provided as the result of the first game in the portable game machine 1, then transmits the stored information data to the minicar 30, thereby moving the minicar 30 for playing a second game. FIG. 1 shows how two game players move their minicars 30 for playing a car race as the second game. However, one game player can also enjoy moving the minicar 30. A detailed description is given below:

FIG. 2 is a functional block diagram to describe the function of the portable game machine 1.

A cartridge 20 storing a game program 21a is placed in the portable game machine 1 for advancing the game program 21a for the game player to play a game.

The cartridge 20 comprises ROM (read-only memory) 21 storing the above-mentioned game program 21a, video data 21b of characters, etc., appearing in games, and sound data 21c for producing a sound during gaming, which will be hereinafter referred to as stored data.

The portable game machine 1 comprises RAM (random access memory) 2 for advancing the game program 21a, a display drive circuit 3 for displaying the video data 21b as video, a sound reproduction circuit 4 for reproducing the sound data 21c as a sound, a CPU (central processing unit) 5 for giving a transfer instruction of the stored data, a controller 6 for the game player to enter his or her intention during gaming, and memory 7 for storing information data provided as the result of a game. A liquid crystal display unit 3a is connected to the display drive circuit 3. A sound reproduction unit 4a containing a loudspeaker, etc., is connected to the sound reproduction circuit 4. The game player keeps track of the gaming state according to video display and sound production.

The game apparatus in the embodiment enables attachment of a radio unit 8 for transmitting the information data in the memory 7 of the cartridge 20 to the minicar 30.

Figure 3:
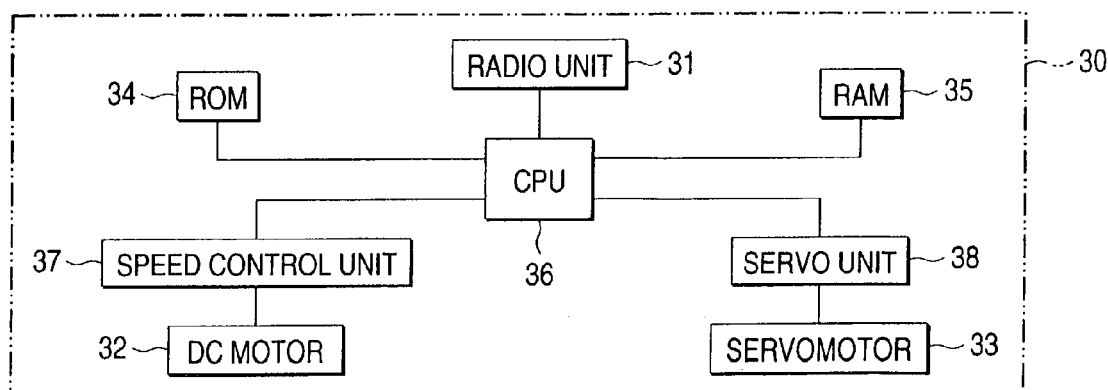
FIG. 3 is a functional block diagram to describe the function of a minicar 30.

FIG. 3 is a functional block diagram to describe the function of the minicar 30.

The minicar 30 comprises a radio unit 31 for receiving information data sent from the portable game machine 1, a DC motor 32 driven based on the information data received through the radio unit 31, a servomotor 33 for changing the direction of the wheels of the minicar 30, ROM 34 storing a program for processing the received information data, RAM 35 for processing the information data based on the program stored in the ROM 34, and a CPU 36 for transferring the processed information data to the motors. A speed control unit 37 for controlling the number of revolutions of the DC motor 32 is connected to the DC motor 32. The turning direction of the DC motor 32 can also be changed under the control of the CPU 36.

A servo unit 38 for driving the servomotor 33 is connected to the servomotor 33.

Next, the structures of the portable game machine 1 and the minicar 30 will be discussed.

Figure 4:
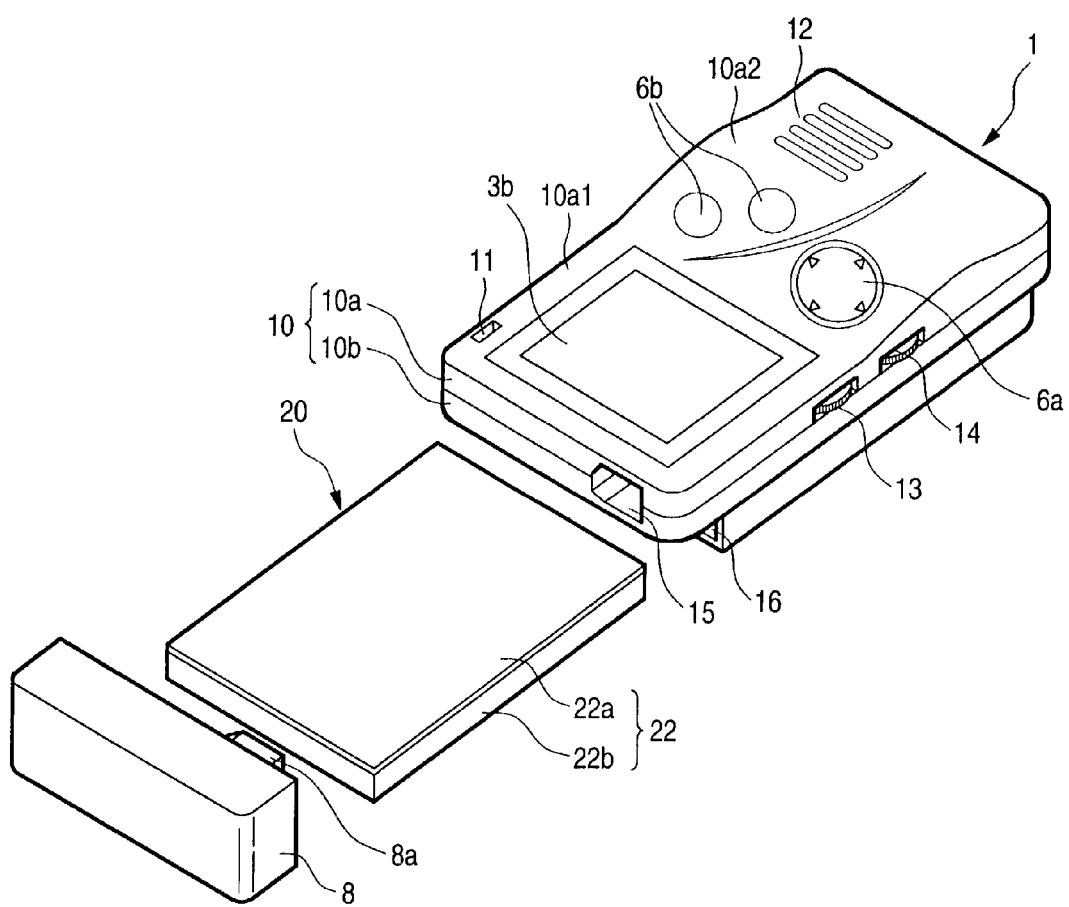
FIG. 4 is a perspective view of the main part to show the portable game machine 1.

FIG. 4 is a perspective view of the main part to show the portable game machine 1.

The portable game machine 1 has a case body 10 made of an ABS resin comprising an upper case 10a and a lower case 10b attached and fixed in overlap relation. The case body 10 stores the above-described various functions in the space formed by the upper and lower cases 10a and 10b.

The surface of the upper case 10a has a flat portion 10a1 and a curved face portion 10a2.

The flat portion 10a1 contains a liquid crystal screen 3b of the liquid crystal display unit 3a. The liquid crystal screen 3b is formed in a side portion with an opening 11 to attach a strap or a chain for the game player to hold the portable game machine 1.

A controller 6 comprising three roughly circular parts for the game play to enter commands is disposed on the curved face portion 10a2. The three parts of the controller 6 are a key button 6a that can be manipulated by the game player who presses any of four triangles in FIG. 4 with his or her finger and two pushbuttons 6b disposed in a lateral direction of the key button 6a.

Four long holes 12 for making a sound produced from the sound reproduction unit 4a easy to hear on the outside are made side by side in the downward direction of the pushbuttons 6b.

A rotary control 13 for changing the contrast of the liquid crystal screen 3b and a rotary volume control 14 for changing the volume of sound generated from the sound reproduction unit 4a are disposed and can be manipulated manually by the game player.

A pushbutton power switch (not shown) is disposed in an opposite side of the upper case 10a.

Further, a communication connector 15 for electrically connecting the portable game machine 1 to the radio unit 31 for transmitting information data in the portable game machine 1 by radio to the minicar 30 is disposed in one end face of the case body 10.

An insertion slot 16 for inserting the cartridge 20 is made in one end face of the lower case 10b.

A power connector (not shown) for obtaining an external power supply other than a battery and an earphone connector for allowing only the game player to listen to sound generated from the sound reproduction unit 4a are disposed in an opposite end face of the case body 10.

The case body 10 contains a circuit board (not shown) where various functions are placed at predetermined positions. On the lower face of the circuit board, a connector (not shown) for electrically connecting the circuit board to the cartridge 20 is placed on the depth side of the insertion slot 16 of the lower case 10b.

A circuit board (not shown) on which the ROM 21 is mounted is housed in a case body 22 of the cartridge 20. The case body 22 consists of an upper case 22a and a lower case 22b and is attached and fixed by screws (not shown) An opening (not shown) is made in the end face in the insertion direction of the case body 22 into the portable game machine 1 and a wiring pattern of the circuit board is extended to the inside of the opening. Terminals of the wiring pattern of the circuit board are attached to the connector of the portable game machine 1 for electric connection. The cartridge 20 can be attached to and detached from the connector.

The radio unit 8 contains a battery (not shown) as well as a connection plug 8a for electrically connecting the radio unit 8 to the communication connector 15 of the portable game machine 1.

Next, the minicar 30 will be discussed.

Figure 5:
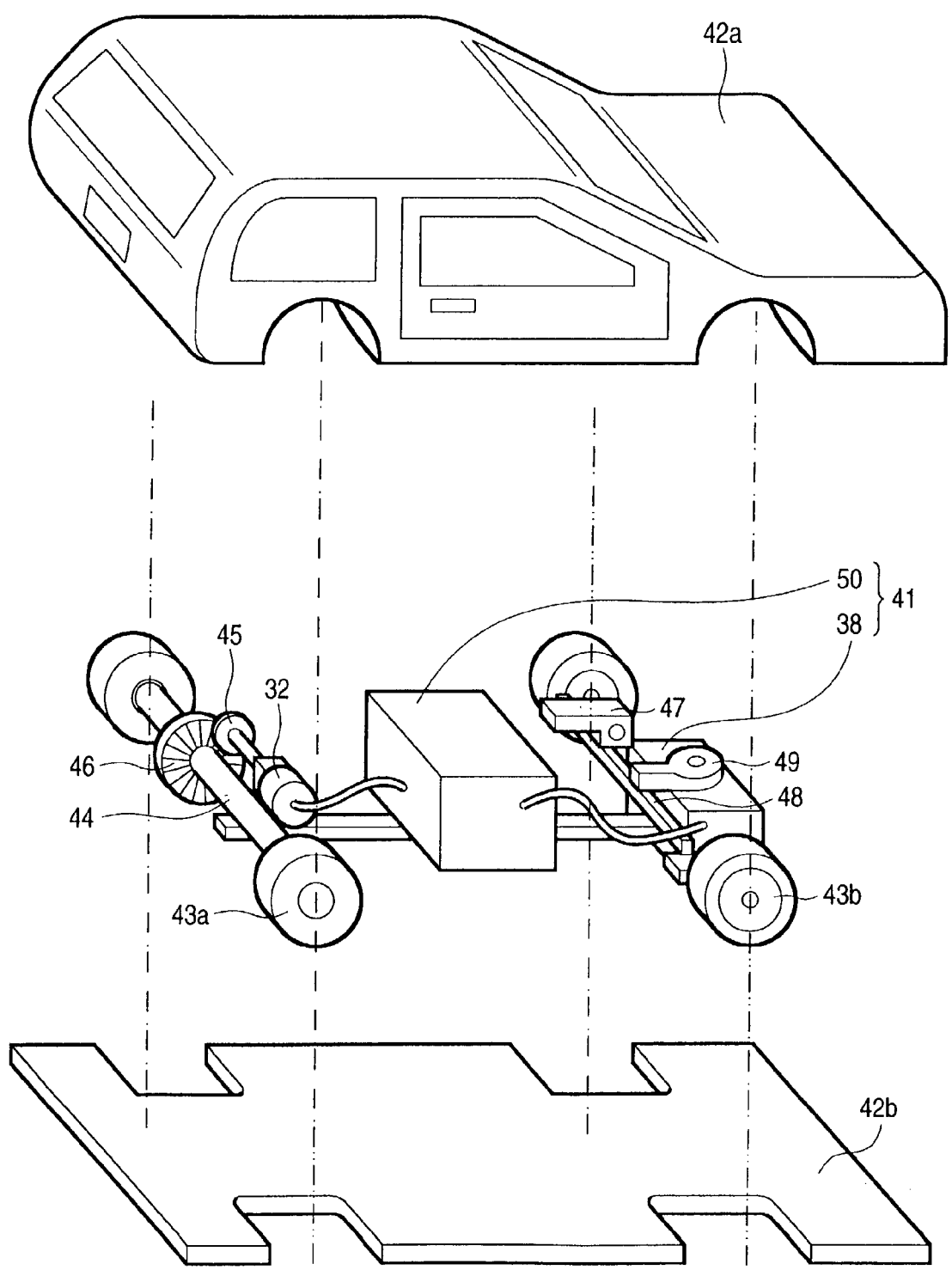
FIG. 5 is an exploded view of the main part to describe the structure of the minicar 30.

FIG. 5 is an exploded view of the main part to describe the structure of the minicar 30.

The minicar 30 is made up of a drive section 40, a main body 41, and a frame containing an upper frame 42a and a lower frame 42b.

The drive section 40 has four rotatable wheels 43. Rear wheels 43a of the wheels 43 are supported on a columnar shaft 44 for rotation by drive of the DC motor 32. The shaft 44 is rotated via a bevel gear 45 and a spur gear 46. Front wheels 43b of the wheels 43 are supported on supports 47 for rotation. The supports 47 are connected by one shaft 48 and are attached and fixed to the frame 42 described later. The shaft 48 is connected to a lever 49 and horizontally moves as the lever 49 is turned. Therefore, the direction of the front wheels 43b is changed as the shaft 48 horizontally moves. The lever 49 can be turned by angle determined by the servomotor 33 (not shown in FIG. 5).

The main body 41 has a unit 50 comprising a circuit board (not shown) on which the radio unit 31, the speed control unit 37 connected to the DC motor 32, the ROM 34, the RAM 35, and the CPU 36 (see FIG. 3) are mounted and a power supply of a battery, etc., for operating the components, the unit 50 being disposed between the rear wheels 43a and the front wheels 43b, and the servo unit 38 being disposed before the front wheels 43b for driving the servomotor 33 for turning the lever 49. A power switch (not shown) that can be turned on and off manually by the game player is disposed in the unit 50.

The drive section 40 and the main body 41 are housed in the frame so as to be covered with the upper frame 42a and the lower frame 42b. The upper frame 42a and the lower frame 42b are attached and fixed by screws, etc., (not shown).

The operation for moving the minicar having the structure is as follows:

The game player manipulates the controller key button 6a of the portable game machine 1 for running the minicar 30. For example, if an upper part 6a1 of the controller key button 6a is pressed, it is sent to the CPU 36 via the radio units 8 and 31 and the speed control unit 37 increases the number of revolutions of the DC motor 32. Likewise, if a lowerpart 6a2 of the controller key button 6a is pressed, the turning direction of the DC motor 32 is reversed and the minicar 30 runs backward.

If a left part 6a3 of the controller key button 6a is pressed, the servo unit 38 turns the servomotor 33 for turning the lever 49 clockwise, horizontally moving the shaft 48 left accordingly. As the support 47 connected to the shaft 48 rotates on a shaft (not shown) of the support 47 clockwise, the direction of the front wheels 43b is changed to the left, changing the running direction of the minicar 30 to the left. Likewise, if a right part 6a4 of the controller key button 6a is pressed, the running direction of the minicar 30 is changed to the right.

Next, a game playing procedure using the described game apparatus will be discussed.

FIG. 6 is a flowchart to describe a flow for the game player to play a game with the game apparatus.

The game consists of a step for the game player to play a first game using the portable game machine 1 and a step for playing a second game to transmit information data provided according to the result of the first game and move the minicar 30 based on the information data.

In the first game, artificial minicars 30a corresponding to the minicars 30 are displayed on the liquid crystal screen of the portable game machine 1 and the game program 21a in the cartridge 20 is advanced, whereby a race game of the artificial minicars 30a is played on the liquid crystal screen. As the race game, for example, several artificial minicars 30a are started at the same time and are run on a determined race course and the artificial minicar 30a of the game player is run as fast as possible so that the artificial minicar 30a do not collide with any other artificial minicar 30a or the side wall of the course for raising the goal ranking.

The goal ranking is converted into the obtained points of the game player, which are stored in the memory 7 of SRAM, etc., in the portable game machine 1 in order each time the car race ends.

Next, the second game is played.

To play the second game, the information data based on the obtained points of the first game is transmitted to the minicar 30 and the minicar 30 is moved based on the information data.

First, each game player detaches the cartridge 20 used for the first game from the portable game machine 1 and instead attaches a second-game cartridge 20a for playing the second game to the connector in the portable game machine 1. The second-game cartridge 20a has almost the same function as the cartridge 20 shown in FIG. 2 and ROM of the second-game cartridge 20a stores a second-game program for receiving game player's manipulation of the controller 6 and transmitting information data to the minicar 30 in response to the manipulation of the controller 6.

Further, the game player places the radio unit 8 in the portable game machine 1 so that the connection plug 8a is connected to the communication connector 15.

In this state, the game player turns on the power switches of the portable game machine 1 and the minicar 30.

Next, the game player manipulates the controller 6 for transmitting the information databased on the obtained points in the first game to the minicar 30 via the radio unit 8 for moving the minicar 30.

Here, the specific contents of the second game will be discussed.

In the second game, a number of game players manipulate their respective portable game machines 1 for running their minicars in a preset car race track dedicated to the minicars for competing for goal ranking.

In this case, the game players use the same cartridges 20a and have a car race based on the game program. The timing at which the car race is started is determined arbitrarily by each player who manipulates the controller 6. Manipulation of running the minicar 30 during the car race (for example, changing the moving direction or speed of the minicar) is also determined arbitrarily by each player who manipulates the controller 6.

In the embodiment, each game player can specially run the minicar 30 in response to the obtained points in the first game.

For example, each time the obtained points in the first game increase, the maximum speed of the minicar can be raised or fast start of the minicar is enabled; it is very advantageous in the car race.

Also possible as other special runs are 8-letter run, so-called willy run of run only with the rear wheels 43a, drift run of changing the direction of the minicar 30 itself by rapidly dropping the run speed at the same time as the direction of the wheels is changed rapidly, and one-side run of run with only the left or right wheels in response to the obtained points in the first game.

Any of the special runs is executed by the game player who manipulates the controller 6 at his or her desired timing. A number of special minicar run programs responsive to the obtained points in the memory 7 are previously stored in the ROM of the second-game cartridge 20a.

Further, when the game player finds out minicar run of his or her own not stored in the ROM while running the minicar 30, he or she can store the run in the memory 7 of the portable game machine 1. After storing minicar run of his or her own, the game player can make the minicar reproduce the run of his or her own by simple controller manipulation. In doing so, the game player can cause the minicar to make run of his or her own on which nobody hits by manipulating the controller in his or her own manner, and is strongly attached to the minicar; in addition, he or she can play an unprecedented interesting game dominated by the game player.

When the minicar 30 is run, the artificial minicar 30a is run on the liquid crystal screen 3b in the portable game machine 1 based on the data in the ROM of the cartridge 20a.

In the embodiment, the actual motion of the minicar 30 can also be liked with the artificial minicar 30a on the liquid crystal screen 3b. For example, when the minicar 30 is spirally run, spiral running of the artificial minicar 30a is displayed on the liquid crystal screen 3b. To do this, video most related to the game player's manipulation contents of the controller 6 and the game program progress situation is displayed on the liquid crystal screen 3b from among a number of video data pieces previously stored in the ROM of the second-game cartridge 20a, whereby the game player sees the display as if the motion of the minicar 30 is linked with that of the artificial minicar 30a.

The link scene is thus displayed, whereby the game player can actually acknowledge the fictitious motion of the artificial minicar 30a on the liquid crystal screen 3b as the motion of the minicar 30, can feel that the imaginary move of the artificial minicar 30a is real, can easily have empathy with his or her minicar 30 and artificial minicar 30a, and can more enjoy the game.

Of a number of sound data pieces previously stored in the ROM of the second-game cartridge 20a, the data related to the game player's manipulation contents of the controller 6 and the game program progress situation (for example, sound data at the jack-rabbit start time) can also be produced as a sound from the sound reproduction unit 4a, causing the game player to feel that the imaginary move of the artificial minicar 30a is real or have empathy with his or her minicar 30 and artificial minicar 30a as described above.

Further, in the embodiment, the game player can also have a conversation with the minicar 30 through the liquid crystal screen 3b of the portable game machine 1 in the second game.

The conversion is executed based on the game program 21a in the second-game cartridge 20a and in particular, using appropriate data of previously stored video data and sound data according to an instruction of the CPU from the relationship between the game player's manipulation of the controller 6 and the game program 21a progress situation. For example, if the game player manipulates the controller 6 so as to run the running minicar 40 faster during the second game, a message of "this is at full speed," "OK, here we go," or the like is displayed on the liquid crystal screen 3b or a sound is produced through the sound reproduction unit. The game player, who has such a conversation with the minicar 30, is attached to the minicar 30 increasingly and can very enjoy playing the game.

As described above, in the game apparatus in the embodiment, the second game is fairly affected by the information data provided as the result of the first game. While making good use of the information data in the second game, the game player manipulates the controller 6 for running the minicar 30 in a different manner from other minicars or running the minicar 30 as fast as possible for enjoying the car race.

Therefore, the game apparatus can provide the game player with an extremely high interesting game which is unprecedented for actually running the minicar 30 in the second game based on the information data provided as the result of the first game as the artificial minicar 30a run with the portable game machine 1 in the first game.

In the game apparatus of the embodiment, the result of the first game very affects the second game, thus a synergistic effect is produced such that the game player is enthusiastic about the first game to compete with other players for winning the second game; a game containing a large number of enjoyments can be provided.

For example, it is imagined that the game player enjoys the first game at home and increases the obtained points as much as possible, then enjoys a car race as the second game in a place where a large number of people gather, such as a school or a park, or a car race place.

The obtained point data stored in the memory 7 of the portable game machine 1 in the embodiment can be erased by the game player manipulating the controller 6.

In the embodiment, the portable game machine is used as the game machine, but the game machine is not limited to the portable game machine; a home game machine, a personal computer game machine, or an arcade game machine placed in a store such as an amusement arcade may be used. In this case, however, a unit is required for transmitting the information data in the first game to a minicar for playing the second game. It may be a portable game machine as described above or a unit dedicated to manipulation of running the minicar.

The information data provided by playing the first game is sent from the game machine to the unit by wire or radio or via a storage medium such as a memory card. In addition, for example, it is sent from the game machine directly to the unit or the portable game machine attached to the game machine in a state in which the unit or the portable game machine can be electrically connected to the game machine.

That is, without using the radio unit as in the embodiment, for example, the portable game machine and the minicar are connected electrically by a wiring cord and information data can be sent from the game machine to the minicar, so that the minicar can be moved in the range of the wiring cord. A storage medium such as a memory card is placed detachably in the portable game machine used for the first game and information data such as obtained point data is stored on the storage medium, then the storage medium is detached from the portable game machine and is attached directly to the minicar, whereby the information data can also be sent from the game machine to the minicar.

Further, in the embodiment, the first and second games are almost the same in contents (car race), but the invention is not limited to it. The first and second games may differ in contents without being related to each other. For example, a baseball game or a fighting game is played in the first game and the obtained points are increased, then the above-described car race with the minicars is played in the second game.

(Second Embodiment)

Next, a second embodiment of the invention will be discussed.

Figure 7:
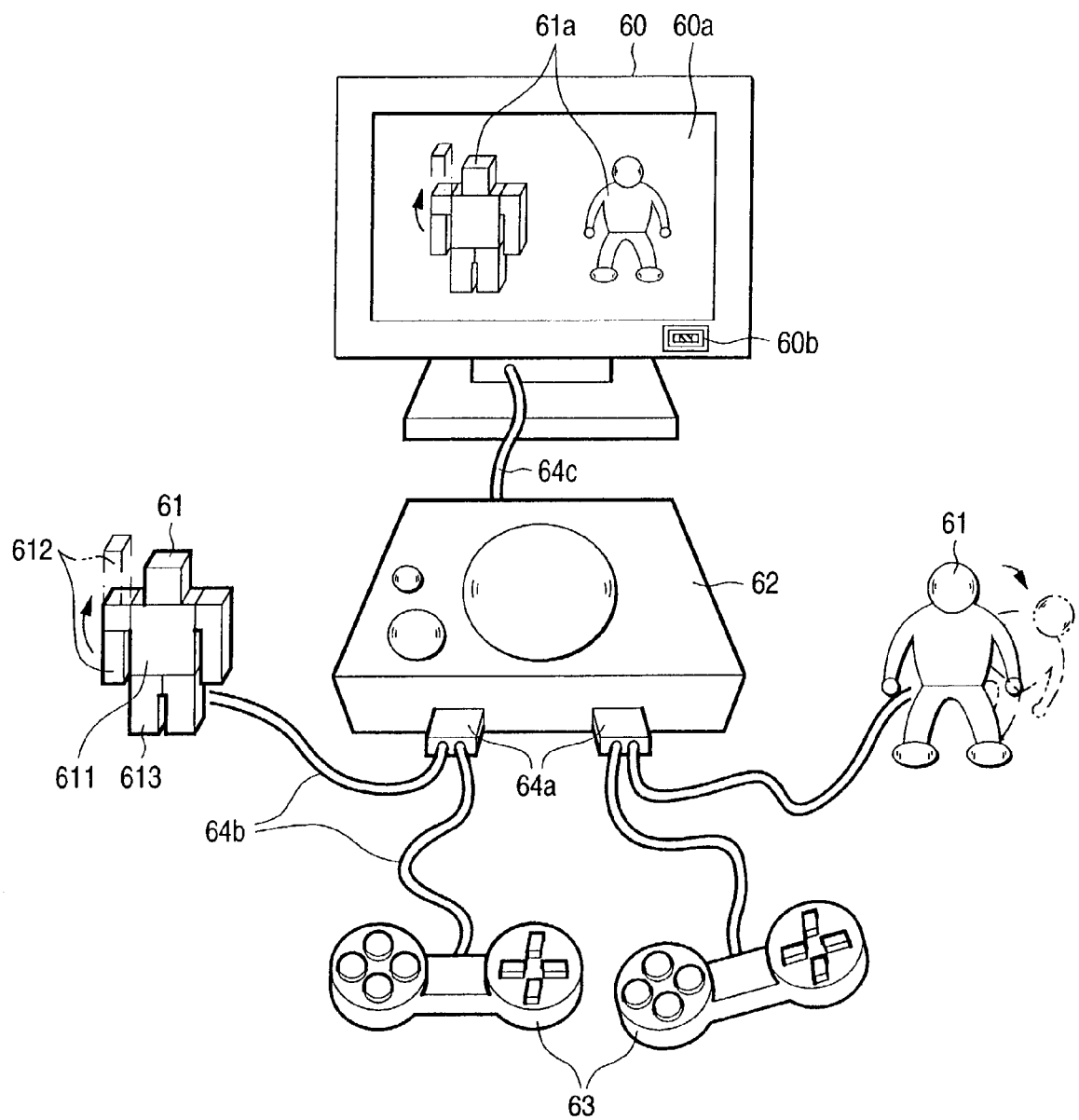
FIG. 7 is an illustration to describe a game apparatus taking a home game machine as an example of a game machine and a robot as an example of a mobile unit of the second embodiment in the invention.

FIG. 7 is an illustration to describe a game apparatus taking a home game machine as an example of a game machine and a robot as an example of a mobile unit.

In a game with a game apparatus of the second embodiment, two game players manipulate artificial robots 61*a* displayed on a television screen 60*a* with controllers 63 connected to a game machine main body 62 until the artificial robot 61*a* of one game player knocks out the artificial robot 61*a* of the other in fighting; on the other hand, the game players cause robots 61 to actually make motions related to the fighting for enjoying the game.

The game apparatus comprises a television 60 having the above-mentioned television screen section 60*a* for displaying the fighting artificial robots 61*a* and a sound reproduction section 60*b* for reproducing sound produced by the artificial robots 61*a*, the above-mentioned robots 61 making motions responsive to the fighting contents, the above-mentioned game machine main body 62 for advancing a game program, and the above-mentioned controllers 63 for the game players to enter commands in the game machine main body 62. The game machine main body 62 is connected to the robots 61 and the controllers 63 through connectors 64*a* and by wiring cords 64*b* and is also connected to the television 60 by a wiring cord 64*c*.

The game machine main body 62 comprises a unit for attaching a CD-ROM (recording medium)—not shown—storing the game program, video data, and sound data. It also comprises a CPU for advancing the game program, transferring the stored data to the television 60 based on the game program and the game player's manipulation of the controller 63, and moving the robots 61.

With the described game apparatus, first the game players cause the artificial robots 61*a* to fight on the television screen 60*a* by manipulating the controllers 63. For example, when one game player causes the artificial robot 61*a* to punch or kick the artificial robot 61*a* of the other during the fighting, the robot 61 of one game player can be caused to punch or kick the robot 61 of the other accordingly. For example, at the termination of each fighting round, the winner robot 61 can be made to hold up hands and the loser robot 61 can be made to fall down although the artificial robots 61*a* on the television screen 60*a* do not follow the motions of the robots 61.

The robot 61 in the embodiment has an immovable body 611, movable arms 612, and movable legs 613. The mechanisms of the parts will not be discussed in detail. The parts are moved by driving a motor (not shown); for example, the arm 612 or the leg 613 is raised or both legs are raised and the robot is made to fall down.

Since the robot 61 comprises a sound reproduction unit containing a loudspeaker, etc., for reproducing a sound, a laughing voice or a groan of the robot 61 can also be produced from the sound reproduction unit in response to the game program progress or based on the game player's manipulation of the controller 63.

In the embodiment, since the movable range of the robot 61 is extremely limited, the arms 612 and the legs 613 are only moved. However, for example, if the robot is made to walk, run, or jump, it is also made possible to cause the robots 61 to actually fight with each other in response to fighting of the artificial robots 61*a* on the television screen. Of course, the game apparatus of the second embodiment also enables the game players to cause the artificial robots on the television screen to fight as a first game and the robots to actually fight as a second game like the game apparatus of the first embodiment. To make the robots actually fight, information data gotten in the first game needs to be transmitted to the robots over the wiring cords 64*b* in the second embodiment. Of course, the game machine main body and the robots can also be provided each with a radio unit for transmitting the information data from the game machine main body to the robots by radio.

Further, in the embodiment, the robots are used as mobile units, but the mobile units are not limited to the robots. For example, models or stuffed toys of pets of dogs, cats, etc., are used and a bringing-up game is played with the game machine main body, then the pet can also be caused to make motions responsive to the pet bringing-up state.

In the invention, a conversational play is also enabled between the game machine (main body) and a mobile unit. For example, the game player previously determines the motion contents of the mobile unit (for example, motion of making a bow) by manipulating the game machine (main body) and later reproduces the motion by simple manipulation (for example, the game player enters a character string of "good morning"). In the description given above, the mobile units as three-dimensional toys are taken as an example, but the invention is also applicable to artificial mobile units moving on the liquid crystal display screen.

In the invention, a mobile unit is caused to make a motion (for example, a singer doll is made to dance) based on information data from the game machine (main body) and further, for example, an artificial mobile unit on the display section of the game machine (main body) can also be caused to make almost the same motion as the mobile unit. In addition, when the game player causes a mobile unit to make a unique motion thought out by the game player (for example, he or she causes a singer doll to make a marvelous dance nobody has ever seen), an artificial mobile unit on the display section can also be caused to make a unique motion similar to that of the mobile unit.

(Third Embodiment)

Figure 8:
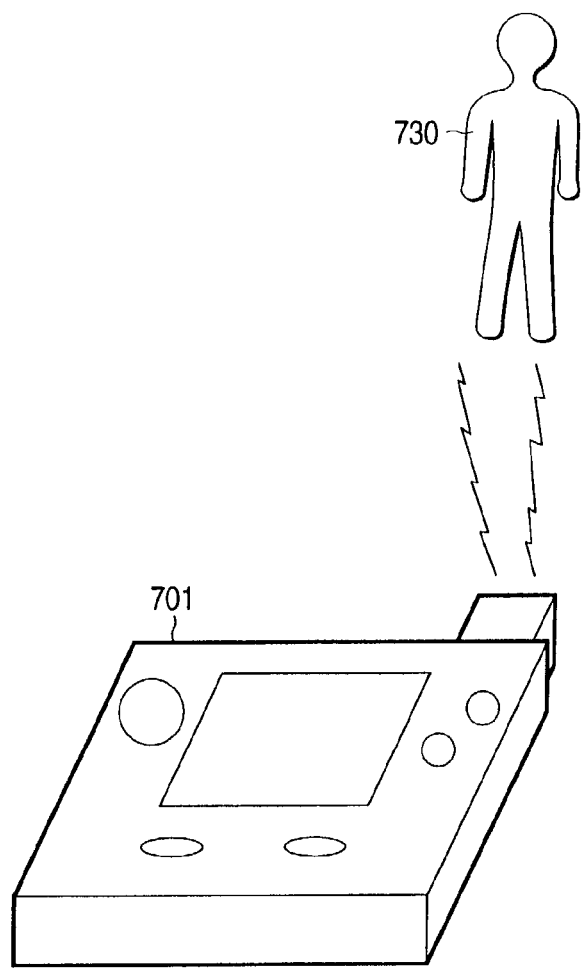
FIG. 8 is a perspective view of the main part to show the third embodiment of a game system in the invention.

FIG. 8 is a perspective view of the main part to show a third embodiment of a game system in the invention.

In the game system according to the invention, there is provided a game system for a game player to play a game using a manipulation machine 701 as a controller and a doll 730 imitating an idol singer as a toy. It is possible for the game player to manipulate the controller 701 for moving the doll 730 for bringing up a toy motion and store the brought-up toy motion (storage step), and for the game player to manipulate the controller for reproducing the stored toy motion (reproduction step). The game player enjoys dance of the doll 730 that the game player makes himself, and can compete dancing with dolls of others.

Figure 9:
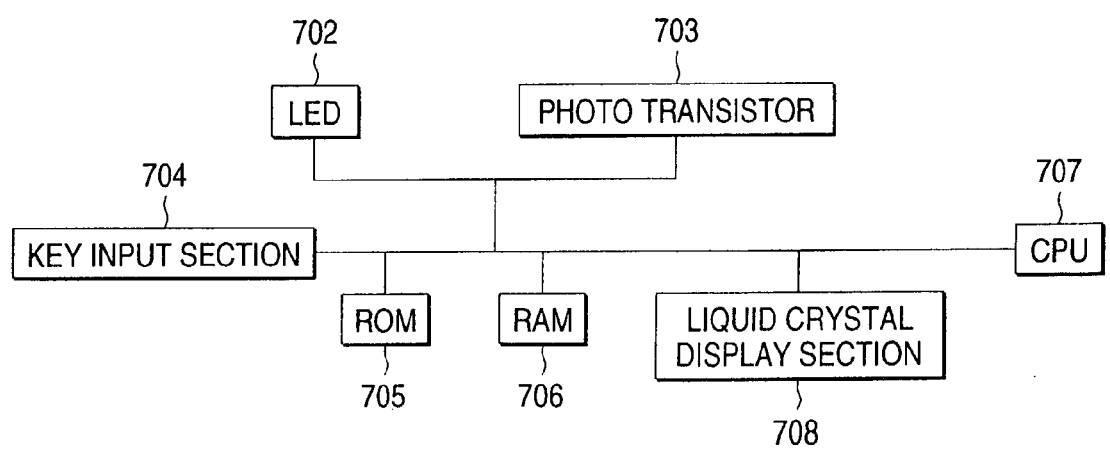
FIG. 9 is a functional block diagram to describe the function of a manipulation machine in the embodiment of the invention.

FIG. 9 is a functional block diagram to describe the function of the manipulation machine 701.

The manipulation machine 701 comprises an LED (light emitting diode) 702 for emitting infrared radiation as transmitted information data, a photo transistor 703 for receiving infrared radiation as transmitted information data emitted from a doll 730 (described later), a key input section 704 for the game player to manually manipulate, ROM (read-only memory) 705 previously storing a program for moving the doll 730, RAM (random access memory) 706 for storing information data as motion of the brought-up doll 730, a CPU (central processing unit) 707 for giving an instruction for transmitting the information data in the ROM 705 and the RAM 706 to the doll 730, and a liquid crystal display section 708 for displaying a message for the game player.

The CPU 707 can give an instruction for once storing motion of the brought-up doll in the RAM 706 and an instruction for once storing the information data from the doll 730 in the RAM 706 and displaying the information data on the liquid crystal display section 708 as a message.

Figure 10:
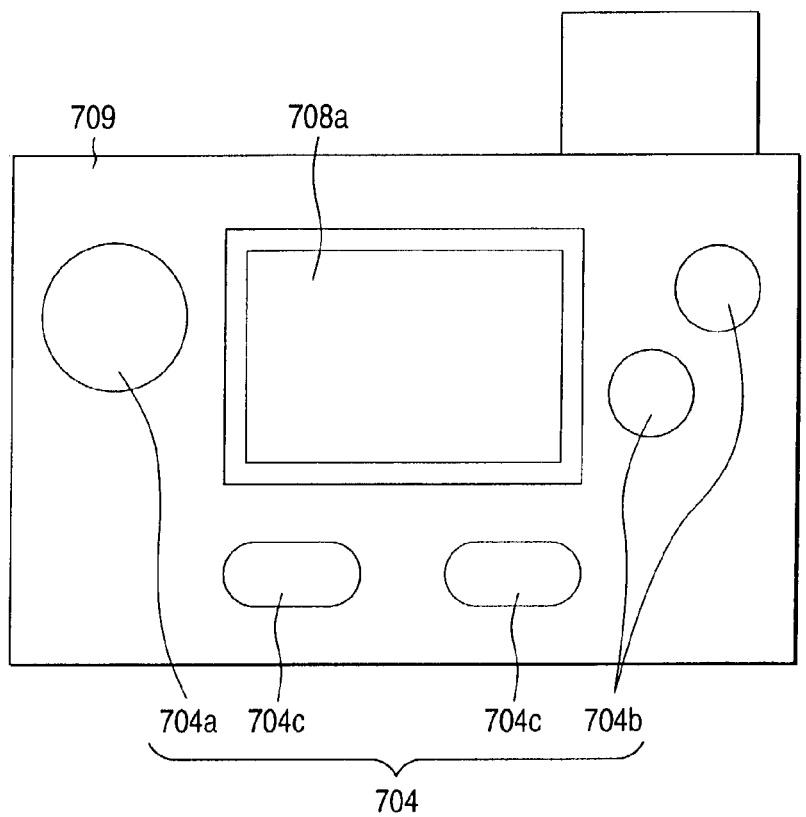
FIG. 10 is a plan view to show the manipulation machine in the embodiment of the invention.

FIG. 10 is a plan view to show the manipulation machine 701.

In the figure, numeral 709 is a case body made of a resin such as an ABS resin for storing the above-described functions. A liquid crystal display panel 708a is disposed almost in the center of the surface of the case body 709. The key input section 704 is disposed on both the left and right and the lower side of the liquid crystal display panel 708a. The key input section parts 704a and 704b positioned on both the left and right of the liquid crystal display panel 708a are disposed to move the doll 730 during gaming and support transmission and reception of information data. The key input section parts 704c positioned on the lower side of the liquid crystal display panel 708a are provided for starting a game and selecting the game type. In addition, an external power supply connector, a display contrast control of the liquid crystal display panel 708a, and the like are contained although they are not shown in FIG. 10.

Figure 11:
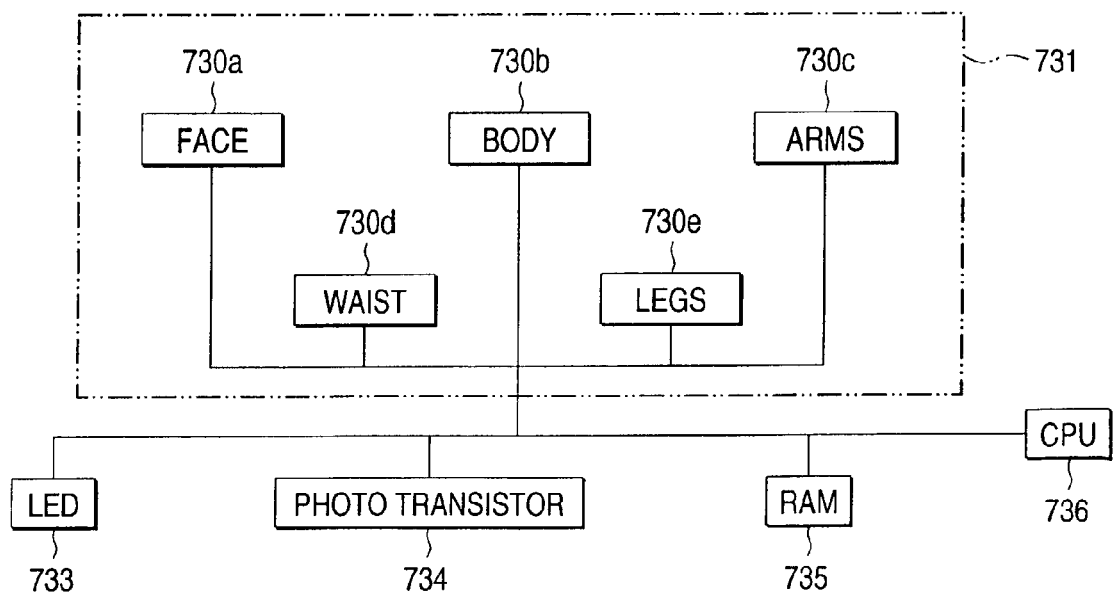
FIG. 11 is a functional block diagram to show the function of a doll used in the embodiment of the invention.

FIG. 11 is a functional block diagram to show the function of the doll.

The doll 730 is separated into units of a face 730a, a body 730b, arms 730c, a waist 730d, and legs 730e. The waist 730d is fixed to a support rod (not shown) and is immovable, but other units are disposed so that they are movable separately.

Each arm 730c is separated into an arm part 730c1 and a hand part 730c2 and each leg 730e is separated into a leg part 730e1 and a foot part 730e2. The units are joined so that they can be rotated and bent by small-sized servomotors 731 contained in the doll 730.

The doll 730 also contains a reception section 732 for receiving information data from the manipulation machine 701. A phototransistor 734 is used as the reception section. The doll 730 further contains RAM 735 for once storing the information data received through the photo transistor 734 and a CPU 736 for transferring the information data in the RAM 735 to the units and driving the servomotor 731. In the embodiment, only the reception section exists in the doll, but the invention is not limited to it. A transmission section, such as an LED, is contained in the doll 730, whereby a response to the information data received in the doll 730 can also be transmitted to the manipulation machine 701. The information data corresponding to the response can be previously stored in the RAM 706 in the doll 730; it may be selected and determined in response to the information data received in the doll 730.

Figure 12:
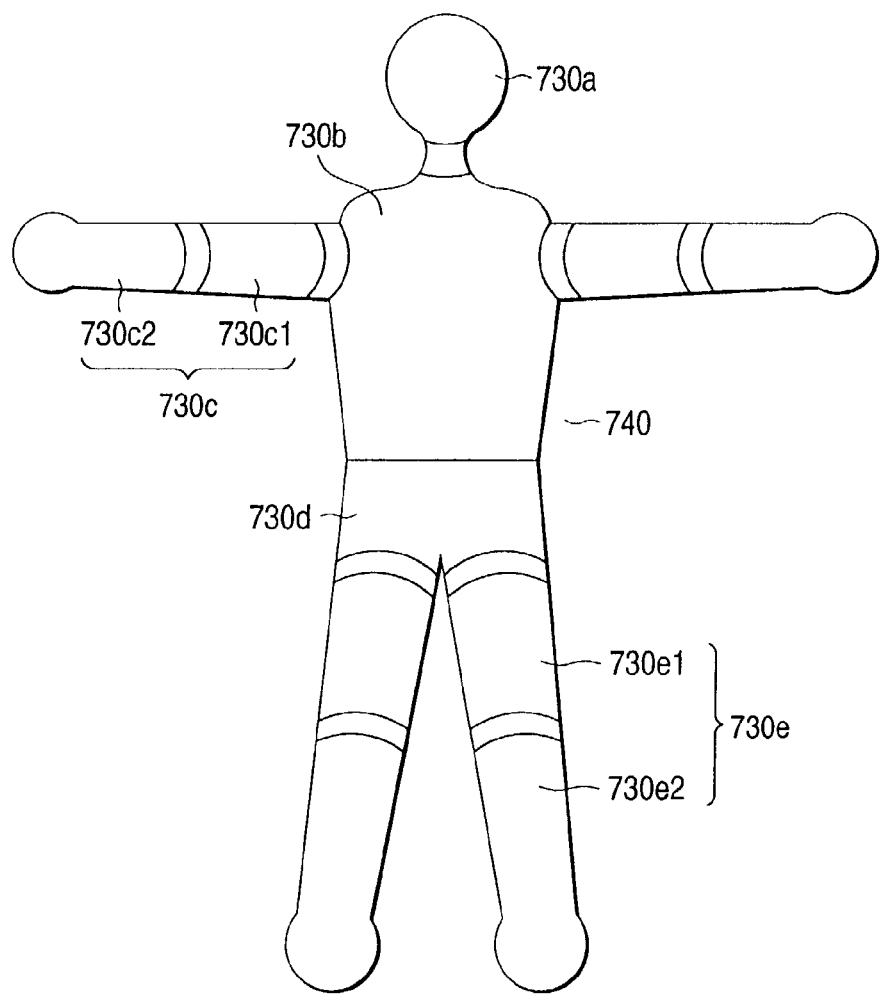
FIG. 12 is a front view to show the doll used in the embodiment of the invention.

FIG. 12 is a front view to show the doll 730.

As shown here, the above-described functions are stored in the hollow case body 740 made of an ABS resin. A form and picture or face photograph imitating an idol singer are placed on the surface of the case body 740 and clothes are put on (not shown in FIG. 12). The above-mentioned servomotor 731 is placed between the units of the doll 730, namely, in each joint although it is not shown in FIG. 12. Each unit is rotated or bent with the joint as the supporting point as the servomotor 731 is turned.

Figure 13:
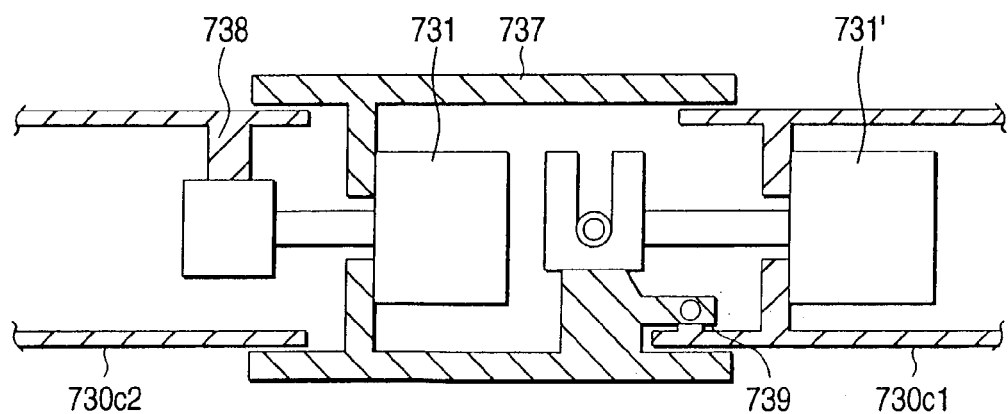
FIG. 13 is an illustration to describe the detailed structure of a joint between an arm part and a hand part taken as an example.

FIG. 13 is an illustration to describe the detailed structure of the joint between the arm part 730c1 and the hand part 730c2 taken as an example.

An intermediate member 737 is placed between the arm part 730c1 and the hand part 730c2. The servomotor 731 is fixed in the intermediate member 737. Since the movable end of the servomotor 731 is fixed to a projection 738 projecting from the inner wall face of the hand part 730c2, the hand part 730c2 is rotated with the intermediate member 737 as the supporting point as the servomotor 731 turns. Further, another servomotor 731' is fixed in the leg part 730c1. The intermediate member 737 is pivotally supported on a projection 739 projecting from the inner wall face of the arm part 730c1 for rotation and the movable end of the servomotor 731' is engaged into the arm part 730c1. Thus, if the servomotor 731' is driven, the movable end is shrunk and the intermediate member 737 turns along the arrow direction in the figure with the pivotal support part as the center accordingly. Other units are rotated and bent according to a similar structure.

Next, a game system flow using the manipulation machine 701 and the doll 730 will be discussed.

First, to start playing a game, the game player manipulating the key input section part 704c of the manipulation machine 701. Then, the game player manipulates the key input section parts 704a and 704b for determining which units of the doll 730 make what motions. For example, the game player manipulates the key input section parts 704a and 704b to determine first bending the left and right hand parts 730c2 45 degrees and second rotating the left and right arm parts 730c1 90 degrees, and once stores in the RAM 706 as information data. Then, the game player manipulates the key input section parts 704a and 704b, thereby transmitting the information data in the RAM 706 via the LED 702 to the photo transistor 734 of the doll 730. The information data transmitted to the doll 730 is once stored in the RAM 735 and is transferred to the servomotors 731 corresponding to the left and right hand parts 730c2 and the left and right arm parts 730c1 according to an instruction of the CPU 736. Resultantly, the doll 730 is driven by the servomotors and the left and right hand parts 730c2 are bent 45 degrees, then the left and right arm parts 730c1 are rotated 90 degrees. The information data corresponding to the doll motion as described above is stored in the RAM 735 in the doll 730 in sequence (storage step).

Such game player's manipulation can be repeated until the game player is pleased. If the motion of the doll 730 provided by game player's manipulation does not please the game player, he or she can again manipulate the manipulation machine 701 to erase the information data stored in the RAM 735. The motion of the doll 730 described above includes two steps in combination, but the invention is not limited to it. Only one motion step or two or more motion steps in association can also be stored. Once stored motions can also be combined into new motion in the RAM 735.

In the embodiment, the motion of the doll 730 is stored in the RAM 735 in the doll 730, but the invention is not limited to it; the motion of the doll 730 can also be stored in the RAM 706 of the manipulation machine 701. A memory cartridge (not shown), etc., for storing information data can also be used separately and can be placed in the doll 730 or the manipulation machine 701 for storing the information data corresponding to the motion of the doll 730 in the memory cartridge, whereby the game player can place a memory cartridge storing a dance brought up and stored by another player or previously storing a dance (for example, available on the market) and simply manipulate the manipulation machine 701, thereby reproducing the dance. Based on the dance, the game player can also bring up and store a new dance to create an upgraded dance. For example, a memory cartridge can be placed in a home game machine or a business game machine and the stored information data in the memory cartridge can be transmitted to the doll 730 by radio or wire by manipulating the controller connected to the home or business game machine for moving and bringing up the doll 730 and storing and reproducing the motion of the doll 730.

The information data pieces corresponding to the motions of the doll 730 stored in the addresses of the RAM 735 are stored in the RAM 706 of the manipulation machine 701 in relation to simple symbols such as numbers.

Next, reproduction of the motion of the doll 730 stored by the game player will be discussed.

For example, if the game player enters "11" through the key input section part 704a, 704b of the manipulation machine 701 and transmits the key input through the LED 702, the information data "11" is received through the photo transistor 734 in the doll 730 and is once stored in the RAM 735 and the data corresponding to the information data "11" is selectively read from the address in the RAM 735 in response to an instruction of the CPU 736 and is transferred to the servomotor 731 for moving the doll 730 (reproduction step).

The motions of the doll 730 separately stored at the storage step can also be made consecutively in time sequence; the motions of the doll 730 corresponding to the information data stored in different addresses of the RAM 735 can also be reproduced at the same time. Specifically, the face 730a and the body 730b of the doll 730 are shaken from side to side at the same time.

Further, in the embodiment, the body 730b of the doll 730 is fixed, but the invention is not limited to it; all parts may be made movable.

In the game system of the invention, motion speed and motion interval time can also be stored and be reproduced in addition to the motion of the doll 730 described above. The speed and the time interval are thus stored, whereby the motion of the doll 730 can be made to music rhythm, for example, and the doll 730 can also be made to dance extremely realistically; the pleasure of creating the motion and dance of the doll 730 by the game player can be provided for the game player.

In the embodiment, the doll 730 imitating an idol singer as a toy is used and dance of the doll 730 created by the game player is watched; a secondary game can also be played, for example, as a dance competition of the dolls 730 brought up and reproduced by the game players. In the embodiment, the doll 730 having the structure as described above is used and the motion thereof is brought up, stored, and reproduced, but the invention is not limited to it; a doll having a simple structure and making only a simple motion (for example, a simple motion of raising and lowering an arm or tilting a head) may be used or anything other than dolls, such as a so-called flower dance (toy produced imitating a flower of tulip, etc., planted in a flowerpot), can also be brought up, stored, and reproduced.

The game system of the invention also enables the game players to play the following games:

For example, the game players can also play a so-called fighting game wherein a model or a doll such as a robot is used as a toy and one player creates and stores unique motions of the robot and makes the robot fight with a robot of another game player.

The game players can also play a so-called car race game wherein a toy minicar is used as a toy and one player creates and stores unique motions of the minicar and makes the minicar race with a minicar of another game player.

In the embodiment, the controller is a special-purpose machine for moving the toy, but not limited to it; for example, a portable game machine with which other games can be played and which has a display screen of a liquid crystal display panel, etc., may be used as the controller. A machine that can be connected to a home game machine, a business game machine, or any other personal computer game machine with which games can be played, and can be manipulated when games are played with the game machines may be used as the controller; the game contents played with any of the game machines and the motion of the toy made by manipulation of the controller can also be related to each other for playing a game.

Further, the game system of the invention also enables the game player to store the brought up toy motions so as to cause the toy to make the motions consecutively for enjoying the consecutive motion sequence, as described above. Since the above-mentioned storage and reproduction steps can be repeated, the game player can store unique motions of the toy and reproduce the stored motions at the timing required by the game player. Of course, the brought up and stored toy motions can be erased; the game player can also erase once reproduced and unfavorite motions and store only favorite motions.

In addition, in the game system in the embodiment, information data is transmitted and received between the controller and the toy by wireless optical communication; it can be transmitted and received by various types of communication, such as radio communication and wire communication with the controller and the toy connected by a wiring cord via connectors, adapters, etc.

(Fourth Embodiment)

In the invention, a landscape portable game machine can be used as a game machine of a structure as described below and a communication unit can be used as means for transmitting information to a mobile unit.

Figure 14:
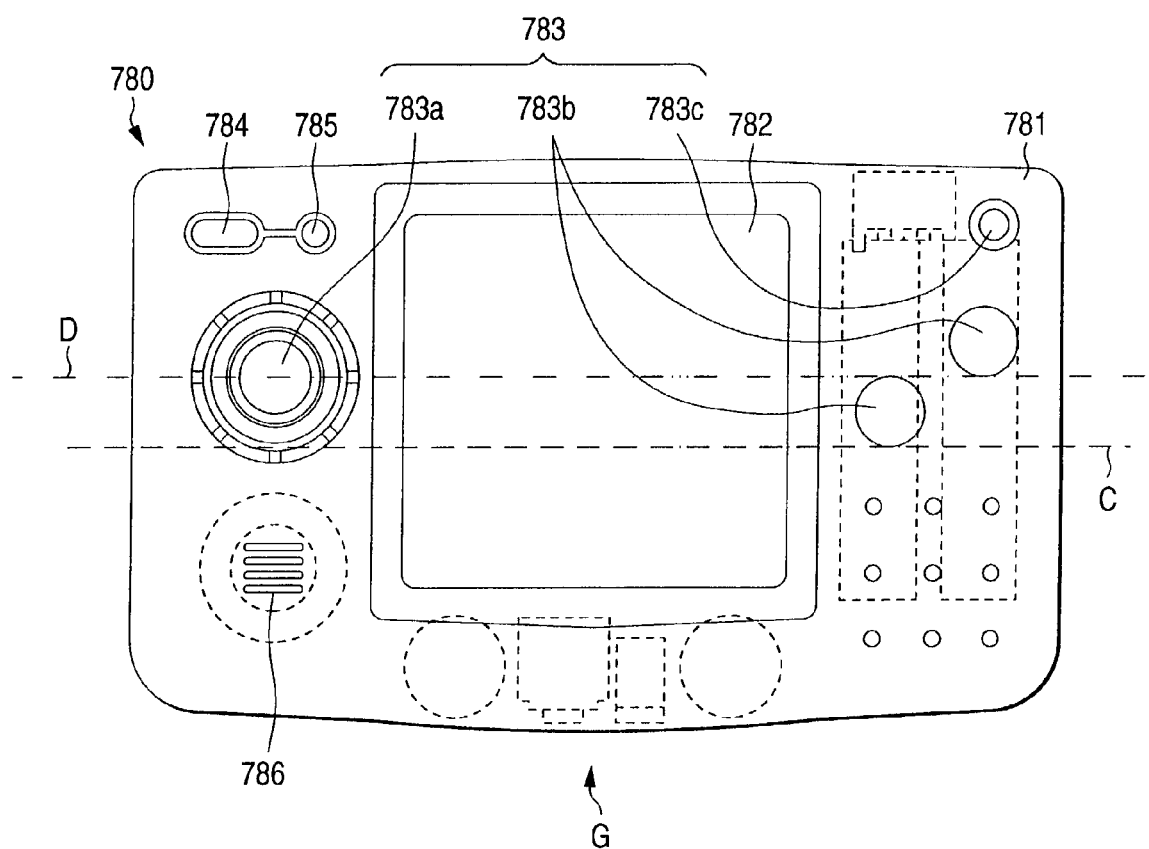
FIG. 14 is a plan view to show a fourth embodiment in the invention.
Figure 15:
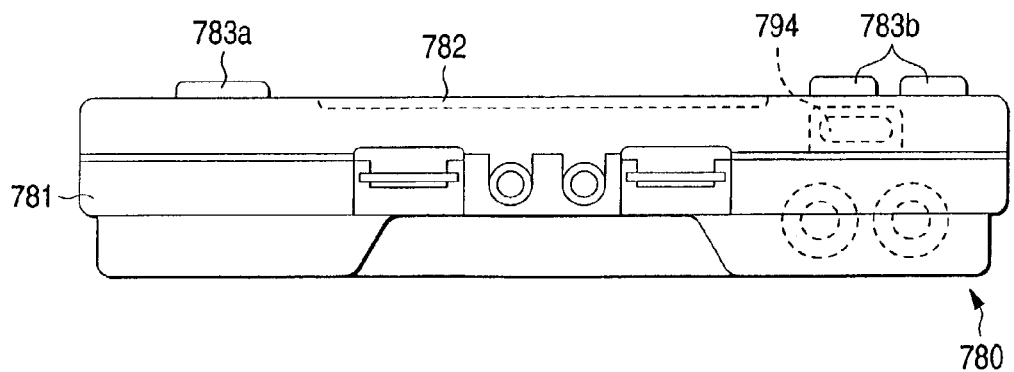
FIG. 15 is a side view to show the fourth embodiment in the invention.

FIG. 14 is a plan view of the game machine, and FIG. 15 is a side view of the game machine.

A game machine 780 comprises a case body 781 for storing functions almost similar to those previously described in the embodiment and a liquid crystal display screen 782 for displaying an image responsive to the game progress for the user is disposed almost in the center in the length direction on the surface of the case body 781. The liquid crystal display screen 782 is disposed so that its center line (alternate long and two short dashes line in the figure) D is positioned slightly above a center line (alternate long and short dash line in the figure) C in the width direction on the case body 781. First input means 783 for the user to enter his or her intention is disposed on the left and right of the liquid crystal display screen 782. The first input means 783 comprises a controller 783a positioned on the left of the liquid crystal display screen 782 and two pushbuttons 783b and a pause key 783c positioned on the right. The controller 783a has four press pressure points (top, bottom, left, and right points). The controller 783a and the pushbuttons 783b (center position of the two pushbuttons) (alternate long and three short dashes line in the figure) F are disposed so as to be positioned slightly above the center line D of the liquid crystal display screen 782. Moreover, the controller 783*a* and the pushbuttons 783*b* are placed almost symmetrically with the liquid crystal display screen 782 between, whereby when the user holds the case body 781 with the palms of left and right hands in contact with both sides of the case body 781, the cushions of thumbs of both hands are positioned at the first input means 783, and input operation becomes extremely easy to perform. To temporarily stop the displayed image, the user turns on the pause key 783*c*. The liquid crystal display screen 782 is disposed almost in the center in the length direction on the surface of the case body 781 as described above, but slightly to the side of the controller 783*a*; namely, to the left, thus the area in the proximity of the side of the pushbuttons 783*b* is formed larger than the side of the controller 783*a* on the surface of the case body 781. The user may select and press a proper one of the two pushbuttons 783*b* at comparatively high speed for advancing a game. To press the two pushbuttons 783*b* alternately at high speed, the operability of the pushbuttons 783*b* can be improved by increasing the area in the proximity of the pushbuttons 783*b* and spacing the pushbuttons 783*b* from each other comparatively largely. On the other hand, if the two pushbuttons 83*b* are spaced from each other too small, the operability of the pushbuttons 783*b* worsens.

Further, a power switch 784 that can be operated manually by the user is disposed above the controller 783*a*. If the user continues to press the power switch 784 for a given time (for example, two seconds), the power switch 784 is turned on. Thus, if the user presses the power switch 784 instantaneously in error, the power switch 784 is not turned on and power waste can be prevented. Further, a light emitting device 785 made up of LED, etc., is disposed at the right of the power switch 784. Thus, for example, if a contrast control of the liquid crystal display screen 782 described later is the darkest and the image is little seen on the liquid crystal display screen 782, the user can immediately determine whether or not the power switch 784 is on, so that power waste with the power remaining on with the operation state of the power switch 84 unknown is lessened.

A number of long holes 786 for allowing the user to easily hear a sound from a loudspeaker 785 are disposed below the controller 783*a*.

Figure 16:
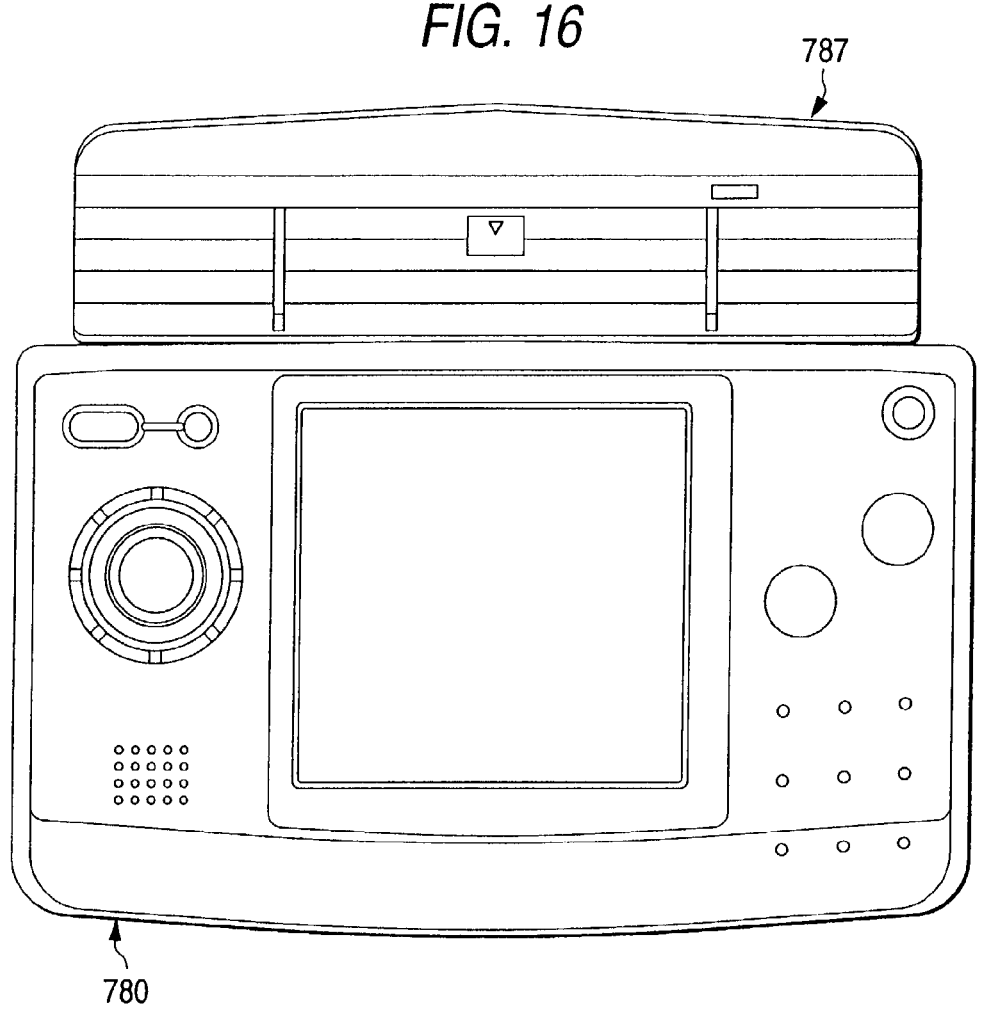
FIG. 16 shows to place the communication unit on the game machine in the embodiment.
Figure 17:
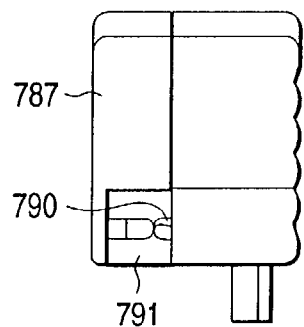
FIG. 17 is an illustration to show the storage section in the embodiment.
Figure 18:
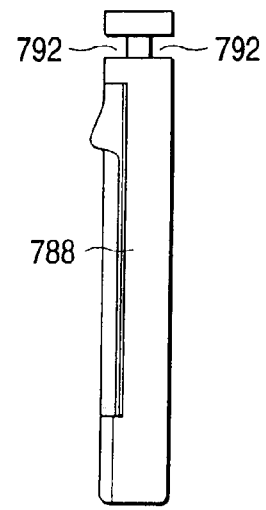
FIG. 18 is an illustration to show the game cartridge in the embodiment.
Figure 19:
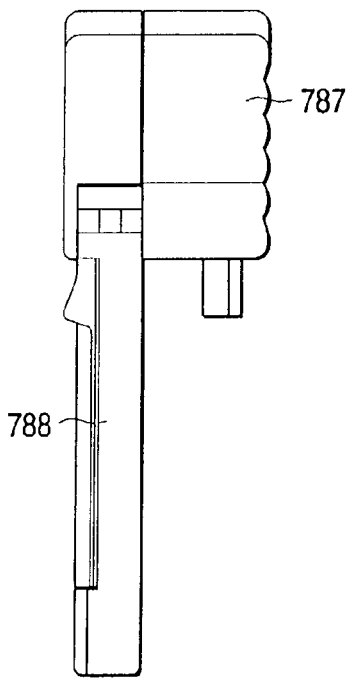
FIG. 19 is an illustration to show an upper portion of the game cartridge in the embodiment.
Figure 20:
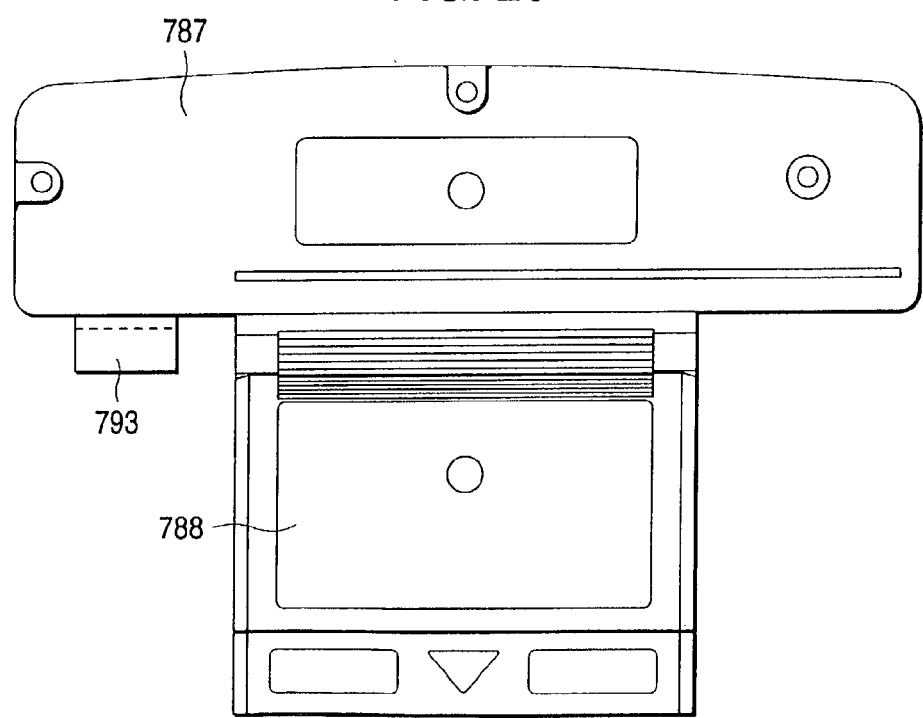
FIG. 20 is a back view to show the game cartridge placed on the communication unit in the embodiment.

A communication unit 787 is placed on the game machine 780 as shown in FIG. 16 and comprises a storage section 791 having belt-like projections 790 for sliding a game cartridge 788 from the left side of the communication unit 787 to the right side. The projections 790 are formed so as to face each other with a given clearance. The storage section 791 stores the upper portion of the game cartridge 788. The game cartridge 788 is formed with two recesses 792 at the positions corresponding to the two projections 790, as shown in FIG. 18. Therefore, the game cartridge 788 is slid with the projections 790 inserted in the recesses 792 and the top part of the game cartridge 788 is attached to the communication unit 787 in a state as shown in FIG. 19. FIG. 20 is a rear view to show a state in which the top part of the game cartridge 788 is attached to the communication unit 787. After the game cartridge 788 and the communication unit 787 are attached integrally, the game cartridge 788 is placed in a connector (not shown) in the game machine 780 and a connector 793 for providing electric connection to the game machine 780 placed in the communication unit 787 is attached to a connector 794 (see FIG. 15) as communication unit placement means attached to the outer surface of the game machine 780. Thus, the communication unit 787 is held by the two connectors. The game machine 780 is formed on the rear face with a recess (not shown) for inserting the game cartridge 788 similar to that shown in the above-described embodiment. Thus, when the game cartridge 788 is placed in the connector of the game machine 780, it is sandwiched between both left and right outer walls of the recess with a slight clearance. Thus, if a rotation or bend moment is added to the communication unit 787 attached integrally with the game cartridge 788, both the outer walls of the recess regulate a move of the game cartridge 788, namely, serve as a holding section, preventing a stress from concentrating on the connector 793 of the communication unit 787.

Further, in the embodiment, a game is advanced while information data is transmitted and received between the game machine and the mobile unit. For example, the mobile unit is displayed as a character on the display screen and information data can also be transmitted to it from the game machine by wireless communication such as radio or optical communication or wire (cable or the like) communication for the game player to cause the character to make his or her desired motion on the display screen. In this case, if the game is a fighting game, for example, as described above, when the game player moves the arms, legs, face, etc., of the character as he or she desired by manipulating the controller, the pushbuttons, etc., and is satisfied with the motions of the character, the game player can store the character motions as one motion sequence and later reproduce the motion sequence by simple manipulation, whereby the game player can have an active feeling for the game in creating the motions of the character although the character is artificial existence only on the display screen. When the game player causes a character to make consecutive motions or a desired motion, first he or she can also move a mobile unit such as a robot of an actual three-dimensional object and actually check the motion of the mobile unit, then cause the character to make the motion on the display screen and vice versa, in which case a very highly interesting game which is unprecedented can be provided for the game player.

According to the game apparatus of the invention, the mobile unit can be moved based on the information data from the game machine (main body), so that the game player can visually check the motion of the mobile unit actually and thus easily has empathy with the mobile unit and an extremely interesting game can be provided for the game player.

According to the game system of the invention, the game player manipulates the controller for bringing up the motions of the toy, whereby he or she can also cause the toy to make unique motions the game player has never seen. By storing new motions, the game player can cause the toy to reproduce the new motions simply by manipulating the controller, so that the game player can be provided with an active game in which the game player creates a toy motion and reproduces it by simple manipulation. Thus, the game player can be provided with the game system that enables the game player to easily have empathy with the toy and is extremely highly interesting.

The invention claimed is:

1. A game system comprising:
    a game machine configured to advance games under a first and a second game program;
    a toy configured to enact actions based on data from the game machine; and
    an information transmitting means configured to transmit data between the game machine and the toy;

wherein the game machine is configured to store results of a play of the first game program as first information data, wherein the game machine is configured for a play of the second game program to cause movement of the toy;

wherein the second game program contains a special action program configured to cause the toy to perform a special action based upon the first information data; and wherein the game machine is configured such that when the second game is advanced, the game machine sends second information data for moving the toy based on the special action program, via the information data transmitting means to the toy.

2. The game system of claim 1, wherein the second information data includes data for basic actions of the toy based on the play of the second game, and further includes data for special actions of the toy that differ from the basic actions dependant upon the first information data.

3. A game system comprising:

a game machine configured for the play of a first game using a first game program, and of a second game using a second game program, the first game program being configured to generate result-data as a result of playing the first game, and the second game program being configured to generate control-data for the play of the second game;

a toy configured to actuate through a variety of motions in response to the control-data during play of the second game; and a communication device configured to transmit the control-data from the game machine to the toy;

wherein the first game is a video game;

wherein the second game is a physical game using the toy; and wherein for a given play of the second game, the second game program is configured to generate control-data that differs depending on the result-data generated by the first game program.

4. The game system of claim 2, wherein the generated control-data includes data for basic actions of the toy based on the play of the second game, and further includes data for special actions of the toy that differ from the basic actions depending upon the result-data.

* * * * *